United States Patent [19]

Ozaki et al.

[11] Patent Number: 5,896,904
[45] Date of Patent: Apr. 27, 1999

[54] TIRE HAVING LOW ROLLING RESISTANCE

[75] Inventors: Yuuichiroh Ozaki; Hirofumi Hayashi, both of Osaka, Japan

[73] Assignee: Toyo Tire & Rubber Co., Ltd., Osaka, Japan

[21] Appl. No.: 08/923,931

[22] Filed: Sep. 5, 1997

[30] Foreign Application Priority Data

Sep. 9, 1996 [JP] Japan .................................. 8-261457

[51] Int. Cl.$^6$ .......................... B60C 11/00; C08K 3/26; C08K 3/36; C08K 9/00
[52] U.S. Cl. ................ 152/209 R; 524/425; 524/493; 524/495; 524/496; 523/200; 523/220
[58] Field of Search .................................. 524/425, 493, 524/495, 496; 523/200, 220

[56] References Cited

U.S. PATENT DOCUMENTS 4,386,169  5/1983  Artur et al. .............................. 523/200
5,496,883  3/1996  Hamada .................................. 524/492

*Primary Examiner*—James J. Seidleck
*Assistant Examiner*—Olga Asinovsky
*Attorney, Agent, or Firm*—Staas & Halsey

[57]  ABSTRACT

The present invention provides a tire having a low rolling resistance, a high abrasion resistance, a low heat build-up and a high tear resistance. The low rolling resistance tire having a tread made of a rubber compound comprises a rubber component, carbon black and silica as reinforcing agents, wherein the rubber component comprises a natural rubber in an amount of 70% by weight or more, the rubber compound further contains a surface-treated calcium carbonate having a surface area by nitrogen adsorption of 15 $m^2/g$ or more and 0 to 5 parts by weight of a softener per 100 parts by weight of the rubber component, and the amount of the carbon black and silica satisfy the following relations (1) and (2), and the amount of the surface-treated calcium carbonate satisfies the relation (3) in terms of parts by weight per 100 parts by weight of the rubber component:

(1)  $35 \leq$ (Carbon black content)+0.75×(Silica content) $\leq 50$.
(2)  $0.2 \leq 0.75$×(Silica content)/(Carbon black content) $\leq 1.0$, and
(3)  $0.05 \leq$ (Calcium carbonate content)/(Silica content) $\leq 0.40$.

5 Claims, No Drawings

TIRE HAVING LOW ROLLING RESISTANCE

FIELD OF THE INVENTION

The present invention relates to a tire having a low rolling resistance, a low heat build-up and an excellent abrasion resistance.

BACKGROUND OF THE INVENTION

In general, requirements for automobile tires are high abrasion resistance, low rolling resistance, low heat build-up, high tear resistance, high groove cracking resistance, high skidding resistance, etc. These properties need to be well balanced. In recent years, the demand for conservation of resources has grown also in the art of tires from the standpoint of environmental protection. Among the foregoing properties, low rolling resistance, which leads to the enhancement of energy efficiency, and high abrasion resistance, high tear resistance and low heat build-up, which prolong the life of tires to enhance the cost performance of materials, are particularly focused. In particular, tires which are used under a large additional load, e.g., tires for truck, commercial car, bus, electric car running with a heavy storage battery on board, etc. are requested to exhibit improvements in the foregoing properties, i.e., low rolling resistance, high abrasion resistance, high tear resistance and low heat build-up while maintaining other general properties. While the automobile is running, the portion of the tire which comes in contact with the ground moves circumferentially and continuously as the tire rotates. During this process, the tread of the tire which has come in contact with the ground undergoes compression deflection, bending deflection and shear deflection under a load while the tread which has been released from the ground restores its original shape. Thus, the various portions of the tire do a repeated work of deflection and restoration. Since the rubber compound constituting the tread exhibits a viscoelasticity in which deflection lags behind stress, it undergoes hysteresis loss during the repeated work of deflection and restoration, converting a part of the driving energy applied to heat energy. This hysteresis loss constitutes the mast part of energy loss accompanying the rolling of the tire called rolling resistance. Thus, the reduction of rolling resistance means nothing but the reduction of the hysteresis loss of the rubber compound constituting the tread. In order to reduce rolling resistance, the formation of the tread by using a rubber compound comprising a rubber polymer which provides a reduced hysteresis loss and carbon black having a large particle size as a reinforcing agent or a reduced amount of carbon black has been attempted. However, the particle size of carbon black relates to its reinforcing effect. Thus, the larger the particle size of carbon black is, the lower abrasion resistance and tear resistance are. Further, when the content of carbon black is reduced, the lowered reinforcing effect is caused, deteriorating abrasion resistance and tear resistance. Therefore, the reduction of rolling resistance without impairing other properties by this method is limited. Accordingly, it is a common practice to form a tread in a 2-layers construction (cap/base). In some detail, the cap, which comes in contact with the ground, is made of a rubber compound having an excellent abrasion resistance while the base, which does not wear in operation, is made of a rubber compound having a low rolling resistance regardless of abrasion resistance. Even in this method, the rolling resistance relates to the sum of the hysteresis loss of the cap and base. If the tread comprises a cap/base construction in which the base is made of a rubber compound having a lower hysteresis loss to exhibit an even lower rolling resistance, the tire undergoes tearing during the terminal period of operation and thus shows a reduced life. Therefore, even such a cap/base construction cannot reduce the rolling resistance to the desired level while maintaining the desired abrasion resistance and tear resistance. From the standpoint of the foregoing problems, JP-A-3-7602 (The term "JP-A" as used herein means an "unexamined published Japanese patent application") proposes a method which comprises the formation of a base by a rubber compound comprising carbon black and silica incorporated therein as reinforcing agents to drastically reduce the rolling resistance of the tire while maintaining endurance of carcass (heat build-up) and tear resistance. Since silica disadvantageously enhances the viscosity of the rubber compound and hence deteriorates the processability thereof as compared with carbon black, it is necessary that the rubber compound having silica incorporated therein comprises a large amount of a softener incorporated therein to have a better processability in order to put itself into practical use. However, if a softener is incorporated in the rubber compound in a large amount, the resulting rubber compound exhibits a reduced abrasion resistance. Therefore, silica is mostly incorporated in the base in the cap/base construction, although the use of silica provides a rubber compound having a low rolling resistance.

SUMMARY OF THE INVENTION

If the processability of a rubber compound reinforced with silica can be improved while maintaining excellent mechanical properties thereof, e.g., low hysteresis, high abrasion resistance and high tear resistance, a tread which exhibits an even lower rolling resistance can be formed by one kind of a rubber compound without being formed into a complicated two-layer construction.

Aiming at the provision of a tire having a single-layer tread which exhibits a low rolling resistance, a high abrasion resistance, a low heat build-up and a high tear resistance, the inventors made an extensive studies of a method for improving the processability of a rubber compound having silica incorporated therein without deteriorating the mechanical properties thereof. Thus, the present invention has been worked out.

The present invention provides a low rolling resistance tire having a tread made of a rubber compound comprising a rubber component which contains a natural rubber mainly, carbon black and silica compounded therein as reinforcing agents. The rubber component contains a natural rubber in an amount of 70% by weight or more based on the total content of the rubber component, and the rubber compound contains the carbon black and silica each in an amount (parts by weight) satisfying the following relations (1) and (2), 0 to 5 parts by weight of a softener, and a surface-treated calcium carbonate having a surface area by nitrogen adsorption of 15 m²/g or more in an amount (parts by weight) satisfying the relation (3), each per 100 parts by weight of the rubber component per 100 parts by weight of the rubber component:

(1) 35≦(Carbon black content)+0.75×(Silica content) ≦50, (2) 0.2≦0.75×(Silica content)/(Carbon black content) ≦1.0, and (3) 0.05≦(Calcium carbonate content)/(Silica content) ≦0.40.

It is preferred that the carbon black and silica to be incorporated in the rubber compound constituting the tread have a surface area by nitrogen adsorption (hereinafter referred to as "$N_2SA$") of from 60 to 150 $m^2/g$ and from 150 to 250 $m^2/g$, respectively. A carbon black having $N_2SA$ of less than 60 $m^2/g$ exerts a small reinforcing effect. On the other hand, a carbon black having $N_2SA$ of more than 150 $m^2/g$ provides the rubber compound with an increased hysteresis loss. A silica having $N_2SA$ of less than 150 $m^2/g$ exerts a small reinforcing effect. On the other hand, a silica having $N_2SA$ of more than 250 $m^2/g$ provides the rubber compound with an increased viscosity and a deteriorated processability.

DETAILED DESCRIPTION OF THE INVENTION

The tread on the tire of the present invention is made of a rubber compound comprising a rubber component containing a natural rubber excellent in mechanical strength such as tear resistance in an amount of not less than 70% by weight, and the silica and carbon black incorporated the rubber component having as reinforcing agents. Examples of the rubber other than the natural rubber which the rubber component can contain include butadiene rubber and styrene-butadiene rubber. The content (parts by weight) of the carbon black and silica to be incorporated in the rubber compound based on 100 parts by weight of the rubber component are such that the following relations (1) and (2) are satisfied. A silane coupler is incorporated into the rubber compound by an ordinary method, generally in an amount of from 0.05 to 0.15 times (by weight) that of silica.

(1) $35 \leq$ (Carbon black content)$+0.75\times$(Silica content) $\leq 50$ (2) $0.2 \leq 0.75\times$(Silica content)/(Carbon black content) $\leq 1.0$ If the amount calculated by the relation (1) is below 35, the resulting rubber compound cannot be sufficiently reinforced and thus exhibits deterioration in mechanical properties such as abrasion resistance and tear resistance. On the other hand, if it exceeds 50, the resulting rubber compound exhibits increased rolling resistance and heat build-up. If the amount calculated by the relation (2) is less than 0.2 or more than 1.0, the content of carbon black and silica are ill balanced, making it impossible to reduce the rolling resistance of the rubber compound while enhancing the abrasion resistance and tear resistance and lowering the heat build-up or maintaining these properties.

The silica having $N_2SA$ of not less than 150 $m^2/g$ to be used in the present invention exhibits a large sorption. Thus, silica particles adsorb each other to form an aggregate, which are reluctant to be destroyed. If silica is incorporated in a rubber, most of the aggregates are dispersed in the rubber in the form of aggregate without being destroyed and dispersed in the form of the primary particles. It is known that with respect to a rubber compound in which an aggregate of a reinforcing agent having a large $N_2SA$ is added, a reduced hysteresis loss and improvements in mechanical properties such as abrasion resistance and tear resistance are exhibited, when the proportion of the aggregates which are destroyed to form primary particles and dispersed in the form of the primary particles is increased even if the rubber compound has the same composition. It is said that the dispersion of a reinforcing agent is improved when the reinforcing agent aggregate is destroyed to form low order particles and the low order particles are dispersed in a rubber. Where a silica having a large $N_2SA$ is added into the rubber component, calcium carbonate surface-treated with a fatty acid, resin acid, lignin, surface active agent or the like can be added to the rubber component prior to or simultaneously with adding the silica. Calcium carbonate is first dispersed in the matrix rubber to increase the elastic modulus of the mixed rubber, whereby the silica aggregate is destroyed to form primary particles and dispersed in the form of the primary particles in the rubber. This enhances the effectiveness of shear strength transferred from the mixer to the silica particles. As a result, the silica particles are well dispersed in the rubber. The resulting rubber compound exhibits a reduced hysteresis loss and better mechanical properties. Generally, a rubber compound reinforced with silica and silane coupler is excellent in properties such as rolling resistance and abrasion resistance as compared with a rubber compound reinforced with carbon black (hereinafter simply referred to as "carbon") but is disadvantageous in that it exhibits an increased viscosity and a dry touch which leads to a reduced extrudability.

However, where the rubber compound contains the foregoing surface-treated calcium carbonate in an amount of from 0.05 to 0.40 times the weight of silica, the rubber compound exhibits an improved extrudability. Semi-finished products extruded or otherwise processed from such a rubber compound can be obtained with an improved dimensional accuracy. If the content of the calcium carbonate is less than 0.05 times that of silica, the addition effect cannot be exerted. On the other hand, if the content of calcium carbonate exceeds 0.40 times that of silica, the resulting rubber compound exhibits a deteriorated abrasion resistance. If a coarse calcium carbonate having $N_2SA$ of less than 15 $m^2/g$ is used, the resulting rubber compound exhibits an improved processability but acts as an impurity that deteriorates mechanical properties such as tear resistance and abrasion resistance. If calcium carbonate which has not been subjected to surface treatment with a fatty acid, resin acid, lignin, surface active agent or the like is used, the resulting rubber compound shows no improvement in processability.

Since the surface-treated calcium carbonate has organized surface, it has improved affinity with a rubber and dispersibility of the particles, and can provide a rubber with increased elongation and tensile strength, and improved flex resistance and tear strength.

Examples of the silane coupler to be incorporated include 3-mercaptopropyl trimetoxy silane and bis-[3-(triethoxysilyl)-propyl] tetra sulfide (e.g., "SI-69" produced by Degussa Co.).

The use of a softener such as process oil (e.g., aromatic oil), plasticizer and resin, which is generally used to improve the processability of the rubber compound, is not preferred in the present invention. If any, such a softener is incorporated in the rubber compound in an amount of not more than 5 parts by weight based on 100 parts by weight of the rubber component. If the content of such a softener exceeds 5 parts by weight, the resulting rubber compound exhibits reduced abrasion resistance and tear resistance.

Besides the foregoing carbon, silica, calcium carbonate and silane coupler, the rubber compound constituting the tread on the tire of the present invention may arbitrarily contain various additives which are conventionally incorporated in rubber compounds for tread. They may be incorporated in an ordinary amount. Examples of the additives include sulfur, vulcanization accelerator, zinc oxide, stearic acid, a wax, and an antioxidant.

The tread may be composed of a cap/base construction in which the cap, which is a substantial moiety that wears during the use of tire, is made of the foregoing rubber compound.

The tire having a tread according to the present invention can be produced using the above-described rubber compound by any known method. For example, the rubber compound is extruded and formed into a tread strip by means of an extruder. From the obtained tread and other members for a tire, a green tire is fabricated, and the green tire is vulcanized in a vulcanizer at 150° C. for 50 minutes to obtain a tire having a tread according to the present invention.

The present invention will be further described in the following examples but the present invention should not be construed as being limited thereto.

EXAMPLES

As indicated in Table below, each rubber component was mixed with carbon, silica, and calcium carbonate, each having a specific $N_2SA$, a silane coupler ("Si-69" produced by Degussa Co.), and an oil in a specific proportion (parts by weight, hereinafter simply referred to as "parts"). To the mixed compound were then added 1 part of an antioxidant (N-phenyl-N'-(1,3-dimethylbutyl)-p-phenylenediamine), 1 part of a wax and 2 parts of stearic acid by means of a Banbury mixer. The mixed compound was then allowed to cool. The mixed compound was then mixed with 1 part of a vulcanization accelerator CBS (N-cyclohexyl-2-benzothiazolyl sulfenamide) and 1.7 parts of sulfur to obtain a mixed rubber. A specimen was sampled from the mixed rubber, and then subjected to measurement of Mooney viscosity, heat build-up test and abrasion test in the manner as mentioned later. The results are set forth in Table. The remaining about 200 kg of the mixed rubber thus obtained was extruded through a 10-in. extruder, in which 80° C. hot water had been circulated, to form a tread strip. The conditions of the tread strip thus extruded were observed to evaluate the processability of the rubber compound according to the following criterion. The results are set forth in Table.

Further, the rubber compounds of the examples according to the present invention and Comparative Examples 1, 2, 3, 8, 11 and 12 were similarly processed into tread strips which were then used to prepare tires having a size of 11/R22.5 on an experimental bases. These tires were then evaluated for rolling resistance, heat build-up, abrasion resistance and tear resistance. The results are set forth-in Table.

Mooney Viscosity

The Mooney viscosity of the rubber compound was measured in accordance with JIS K6300. The results were given in an index calculated by the following equation: (Mooney viscosity of rubber compound)×100/(Mooney viscosity of Comparative Example 1)

Heat Build-up Test

The temperature rise was measured in accordance with JIS K6265. The results were given in an index calculated by the following equation. The smaller this value is, the better is the heat build-up. (Temperature rise of rubber compound)×100/(Temperature rise of Comparative Example 1)

Abrasion Test

Each rubber compound was vulcanized at 140° C. for 50 minutes to obtain a test sample, and the test sample was subjected to Lambourn abrasion test in accordance with JIS K6264. The results were given in an index calculated by the following equation. The larger this value is, the better is the abrasion resistance. (Abrasion loss of Comparative Example 1)×100/(Abrasion loss of rubber compound)

Evaluation of Processability

The tread strip having a length of about 40 m thus extruded was observed for external appearance and measured for width at 10 points. The processability was then evaluated in accordance with the following criteria:

A (good): Those showing no breaking at edge, a good dimensional stability and a strip width scattering of less than 5%;

B (fair): Those showing some but acceptable level of breaking at edge and a strip width scattering of less than 5%;

C (poor): Those showing an unacceptable level of breaking at edge or a strip width scattering of not less than 5%.

Rolling Resistance

The tire was measured for rolling resistance in accordance with the specification of American Society of Automotive Engineers (SAE) J1270. The results were given in an index calculated by the following equation. The smaller this value is, the better is the rolling resistance. (Rolling resistance of tire)×100/(Rolling resistance of Comparative Example 1)

Heat Build-up

The tire was allowed to roll on a drum under high speed durability test conditions specified in FMVSS (Federal Motor Vehicle Safety Standard) 119. A thermistor was immediately inserted into the gap between the tire and the belt at the edge of the belt at which the tread thickness is maximum to effect the measurement of temperature. The results were given in an index calculated by the following equation. The small this value is, the lower is the heat build-up. (Temperature of tire)×100/(Temperature of Comparative Example 1)

Abrasion Resistance

A track on which two kinds of tires had been mounted as rear wheels was allowed to run over 100,000 km. The depth of the groove in the tires were then measured. The difference in groove depth between before and after the running test was then calculated to determine abrasion loss. The results were given in an index calculated by the following equation. The larger this value is, the better is the abrasion resistance. (Abrasion loss of Comparative Example 1)×100/(Abrasion loss of tire)

Tear Resistance

A truck on which the tire had been mounted as rear wheels was allowed to run until the groove depth was reduced to about 1.6 mm. The tread was then stripped from the belt. The length of tears scattered over the inner side of the tread were measured and totalled. The results were given in an index calculated by the following equation. The larger this value is, the better is the tear resistance. (Length of tear in Comparative Example 1)×100/(Length of tear in tire)

TABLE

| | Examples | | | | | | Comparative Examples | | | | | | | | | | | |
|---|---|---|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 | 10 | 11 | 12 |
| Natural rubber | 100 | 100 | 70 | 100 | 100 | 100 | 100 | 100 | 70 | 100 | 100 | 100 | 100 | 100 | 100 | 100 | 70 | 100 |
| Butadiene rubber | | | 30 | | | | | | 30 | | | | | | | | 30 | |
| Carbon A ($N_2SA$:142) | 25 | 20 | 35 | | | | 20 | 35 | | | | 25 | 25 | 20 | 25 | | 35 | |
| Carbon B ($N_2SA$:117) | | | | | | | | | | | | | | | | | | 40 |
| Carbon C ($N_2SA$:74) | | | | 20 | 25 | | | | | 15 | 40 | | | | | | | |
| Carbon D ($N_2SA$:59) | | | | | | 30 | | 20 | | | | | | | 20 | | | |
| Silica A ($N_2SA$:240) | 30 | 20 | | 25 | 20 | 20 | 20 | 25 | | 30 | 10 | 20 | 25 | 25 | 30 | | | |
| Silica B ($N_2SA$:170) | | | 10 | | | | | | 15 | | | | | | | | 10 | |
| Silica C ($N_2SA$:120) | | | | | | | | | | | | | | | | 25 | | |
| Treated calcium carbonate A ($N_2SA$:16) | 4 | 2 | 4 | 2 | 1 | 2 | | 2 | 4 | 2 | 1 | 10 | 1 | | | 4 | 4 | |
| Treated calcium carbonate B ($N_2SA$:5) | | | | | | | | | | | | | | 4 | | | | |
| Untreated calcium carbonate C ($N_2SA$:31) | | | | | | | | | | | | | | | 4 | | | |
| Silane coupler | 3 | 3 | 2 | 2 | 2 | 2 | 3 | 2 | 2 | 2 | 2 | 2 | 3 | 2 | 3 | 2 | 2 | |
| Oil | | | 4 | | | | | | | | | | | | | | | 6 |
| Carbon content + 0.75 × silica content | 47.5 | 35.0 | 42.5 | 38.8 | 40.0 | 45.0 | 35.0 | 53.8 | 31.3 | 37.5 | 47.5 | 40.0 | 43.8 | 38.8 | 47.5 | 38.8 | 42.5 | 40.0 |
| 0.75 × silica content/carbon black | 0.90 | 0.75 | 0.21 | 0.94 | 0.60 | 0.50 | 0.75 | 0.54 | 0.56 | 1.50 | 0.19 | 0.60 | 0.75 | 0.94 | 0.90 | 0.94 | 0.21 | 0.00 |
| calcium content/silica content | 0.13 | 0.10 | 0.40 | 0.08 | 0.05 | 0.10 | 0.00 | 0.08 | 0.27 | 0.07 | 0.10 | 0.50 | 0.04 | 0.16 | 0.13 | 0.16 | 0.40 | — |
| Rubber properties | | | | | | | | | | | | | | | | | | |
| Mooney viscosity (index) | 95 | 94 | 86 | 84 | 87 | 94 | 100 | 104 | 89 | 101 | 83 | 78 | 104 | 82 | 109 | 85 | 78 | 87 |
| Processability | B | B | A | A | A | B | C | C | A | C | A | A | C | A | C | A | A | B |
| Heat build-up (index) | 75 | 90 | 78 | 70 | 71 | 90 | 100 | 103 | 96 | 91 | 100 | 76 | 94 | 82 | 83 | 86 | 78 | 98 |
| Abrasion (index) | 111 | 110 | 116 | 105 | 107 | 111 | 100 | 115 | 98 | 91 | 106 | 90 | 84 | 90 | 89 | 88 | 93 | 104 |
| Tire properties | | | | | | | | | | | | | | | | | | |
| Rolling resistance | 77 | 90 | 79 | 85 | 86 | 91 | 100 | 114 | 92 | Not tested | Not tested | Not tested | Not tested | 89 | Not tested | Not tested | 80 | 110 |
| Heat build-up | 76 | 91 | 82 | 75 | 72 | 91 | 100 | 101 | 98 | | | | | 85 | | | 83 | 98 |
| Abrasion resistance | 110 | 108 | 115 | 104 | 105 | 108 | 100 | 113 | 98 | | | | | 93 | | | 96 | 102 |
| Tear resistance | 106 | 108 | 106 | 112 | 108 | 105 | 100 | 93 | 102 | | | | | 90 | | | 95 | 103 |

The tires of the examples of the present invention are reinforced with silica and carbon. These tires are excellent all in rolling resistance, heat build-up, abrasion resistance and tear resistance as compared with Comparative Example 1, in which the tread is made of a rubber compound free of surface-treated calcium carbonate, or Comparative Example 12, in which the tread is made of a rubber compound-free of silica.

Comparative Example 2 shows that when the value (carbon black content)+0.75×(silica content) is larger than 50, the resulting rubber compound exhibits an increased rolling resistance and a deteriorated processability. Comparative Example 3 shows that when the value (carbon black content)+0.75×(silica content) is smaller than 35, the resulting rubber compound exhibits an improved processability but shows a reduced effect of improving abrasion resistance. Comparative Example 4 shows that when the proportion of silica 0.75×(silica content)/(carbon black content) is raised to more than 1.0, the resulting rubber compound exhibits a reduced heat build-up but shows deteriorated abrasion resistance and processability. Comparative Example 5 shows that when the proportion of silica is decreased to less than 0.2, the resulting rubber compound exhibits improved abrasion resistance and processability but shows no effect of improving heat build up. The comparison of Comparative Example 6 with the examples of the present invention shows that when the value of (calcium carbonate content)/(Silica content) is more than 0.40, the resulting rubber compound exhibits a reduced abrasion resistance. Comparative Example 7 shows that when the value of (calcium carbonate content)/(Silica content) is smaller than 0.05, the effect of calcium carbonate cannot be exerted, making it impossible to improve processability and abrasion resistance. Comparative Example 8 shows that when calcium carbonate having $N_2SA$ of less than 15 m²/g is used, the resulting rubber compound exhibits a reduced heat build-up but shows no improvement in abrasion resistance. Comparative Example 9 shows that even if untreated calcium carbonate is used, the resulting rubber compound shows no improvement in processability and abrasion resistance. Comparative Example 10 shows that when N₂SA of silica used as a reinforcing agent is smaller than 150 m²/g, the resulting rubber compound exhibits a reduced abrasion resistance. The comparison of Comparative Example 11 with Example 3, which is the same as Comparative Example 11 except for the content of the softener, shows that when the content of the softener is more than 5 parts, the resulting rubber compound exhibits a reduced abrasion resistance. The comparison of Comparative Example 12, in which only carbon is incorporated in an amount of 40 parts as a reinforcing agent, with Example 12, in which 20 parts out of 40 parts of carbon is replaced by 20 parts of silica and surface-treated calcium carbonate is added, shows that when carbon and silica are used as reinforcing agents and surface-treated calcium carbonate is added, the resulting rubber compound exhibits a reduced rolling resistance and reduced heat build-up and an increased abrasion resistance and tear resistance.

As mentioned above, the formation of a tread by a rubber compound having silica and carbon as reinforcing agents and surface treated calcium incorporated therein makes it possible to provide the resulting tire with reduced rolling resistance, increased abrasion resistance and reduced heat build-up and increased tear resistance without utilizing a cap/base construction.

While the invention has been described in detail and with reference to specific embodiments thereof, it will be apparent to one skilled in the art that various changes and modifications can be made therein without departing from the spirit and scope thereof.

What is claimed is:

1. A low rolling resistance tire comprising:

a tread made of a rubber compound with carbon black and silica as reinforcing agents, the rubber compound having:
  a rubber component having a natural rubber in an amount of 70% by weight or more,
  calcium carbonate having a surface treated with at least one compound selected from the group consisting of a fatty acid, a resin acid, a lignin and a surface active agent, the calcium carbonate having a surface area by nitrogen adsorption of 15 m²/g or more, and
  0 to 5 parts by weight of a softener per 100 parts by weight of the rubber component, and
the amount of the carbon black and silica satisfy the following relations (1) and (2), and the amount of the calcium carbonate satisfies the relation (3) in terms of parts by weight per 100 parts by weight of the rubber component:
  (1) $35 \leq $(Carbon black content)$+0.75 \times $(Silica content) $\leq 50$,
  (2) $0.2 \leq 0.75 \times $(Silica content)/(Carbon black content) $\leq 1.0$, and
  (3) $0.05 \leq $(Calcium carbonate content)/(Silica content) $\leq 0.40$.

2. The low rolling resistance tire of claim 1, wherein the carbon black to be incorporated in the rubber compound constituting the tread has a surface area by nitrogen adsorption of from 60 to 150 m²/g.

3. The low rolling resistance tire of claim 1, wherein the silica to be incorporated in the rubber compound constituting the tread has a surface area by nitrogen adsorption of from 150 to 250 m²/g.

4. The low rolling resistance tire of claim 1, wherein the carbon black and silica to be incorporated in the rubber compound constituting the tread has a surface area by nitrogen adsorption of from 60 to 150 m²/g and from 150 to 250 m²/g, respectively.

5. A low rolling resistance tire having a tread prepared by molding and vulcanizing a rubber compound, the tread comprising:

(i) a rubber component containing a natural rubber in an amount of 70% by weight or more, (ii) carbon black as a reinforcing agent, (iii) silica as a reinforcing agent, (iv) calcium carbonate having a surface treated with at least one compound selected from the group consisting of a fatty acid, a resin acid, a lignin and a surface active agent, the calcium carbonate having a surface area by nitrogen adsorption of 15 m²/g or more, (v) 0 to 5 parts by weight of a softener per 100 parts by weight of the rubber component, (vi) a silane coupler in an amount of from 0.05 to 0.15 times (by weight) the amount of the silica, and (vii) a curing agent, wherein the amount of the carbon black and silica satisfy the following relations (1) and (2), and the amount of the calcium carbonate satisfies the relation (3) in terms of parts by weight per 100 parts by weight of the rubber component:
  (1) $35 \leq $(Carbon black content)$+0.75 \times $(Silica content) $\leq 50$,
  (2) $0.2 \leq 0.75 \times $(Silica content)/(Carbon black content) $\leq 1.0$, and
  (3) $0.05 \leq $(Calcium carbonate content)/(Silica content) $\leq 0.40$.

* * * * *